Patented Sept. 18, 1923.

1,468,149

UNITED STATES PATENT OFFICE.

OSCAR GERLACH, OF LA SALLE, ILLINOIS.

HEAT-INSULATING MATERIAL AND METHOD OF MANUFACTURE.

No Drawing.   Application filed February 24, 1920. Serial No. 360,826.

*To all whom it may concern:*

Be it known that I, OSCAR GERLACH, a citizen of the German Republic, and a resident of the city of La Salle, in the county of La Salle and State of Illinois, have invented certain new and useful Improvements in a Heat-Insulating Material and Method of Manufacture; and I do hereby declare that the following is a full, clear, and exact description of the same.

This invention relates to heat insulating material and methods of manufacture thereof more particularly adapted for use in insulating flues, stoves and other heated articles.

One of the difficulties in heat insulation is to provide a material all the constituents of which are both non-combustible and insoluble while at the same time the combination possesses sufficient cohesiveness to enable it to be molded and retain its molded form without cracking or breaking when dry.

One of the principal objects of the present invention is to provide a heat insulating material all the constituents of which are both non-combustible and insoluble.

Another object of the invention is to provide an insoluble inorganic binder for a heat insulating material.

A further object of the invention is to provide an improved heat insulating composition which may be readily formed of cheap materials.

Other and further important objects will hereinafter appear.

In making the improved composition a non-combustible preferably refractory material is mixed with a suitable non-combustible insoluble binder to form a pasty mass which may be applied to the article to be insulated while still pasty and then allowed to dry in situ.

One of the most suitable refractory materials is infusorial earth which is not only practically infusible, but also cheap and readily obtainable.

As a binder, very satisfactory results may be obtained with the gelatinous silicates obtained by precipitating solutions of alkali silicates with salts of the metals of the iron, aluminum and in some cases, the alkaline earth groups. Of such silicates, one of the best is aluminum silicate as it is not only gelatinous while wet but also substantially infusible and very refractory towards heat.

In the preferred form of my composition, I add a soluble salt of aluminum such as the sulphate or one of the alums to a solution of sodium silicate or water-glass. Preferably the resulting precipitate is then filtered and washed to free it from the sodium sulphate or other soluble salts resulting from the reaction. The gelatinous aluminum silicate is then mixed, while it is still moist, with infusorial earth, usually in the proportions of five to ten per cent of the former to ninety-five to ninety per cent of the latter. This mixture is then allowed to dry in the desired form either as blocks or as a coating on the article to which it is applied.

While I have referred to the use of infusorial earth and certain gelatinous silicates in making a heat insulation composition, I am aware that other materials may be used and that the proportions and method of preparing the composition may be varied through a wide range without departing from the principles of this invention, and I, therefore, do not purpose limiting the patent granted otherwise than as necessitated by the prior art.

I claim as my invention:

1. A heat insulating composition including a mixture of approximately 90 to 95% infusorial earth and 5 to 10% of gelatinous silicates of metals of the aluminum and alkaline earth groups as a binder.

2. A method of preparing a heat insulating composition including adding a soluble metallic salt to a solution of a silicate, separating the gelatinous precipitate so formed from the salts in solution, and mixing the separated precipitate while it is still moist with infusorial earth.

3. A method of insulating articles comprising mixing 95% to 90% of infusorial earth and five to 10% of freshly precipitated gelatinous aluminum silicate to form a pasty mass, moulding the mass while still pasty around the article to be insulated and allowing the molded mass to dry.

4. The method of making an article of heat insulating material which consists in precipitating gelatinous aluminum silicate from a solution of a soluble silicate by the addition of a soluble aluminum salt, washing the precipitate, mixing it with silica while still moist; forming the mixture while still plastic into the desired shape and permitting it to dry in said form.

In testimony whereof I have hereunto subscribed my name in the presence of two subscribing witnesses.

OSCAR GERLACH.

Witnesses:
 JOHN HOAG,
 CARL W. TRAEGER.